(12) United States Patent
Shin

(10) Patent No.: US 6,247,074 B1
(45) Date of Patent: Jun. 12, 2001

(54) PORTABLE COMPUTER WITH TELEPHONE LINE SWITCHING FUNCTION AND AN EXPANSION SYSTEM AND METHOD FOR USE THEREWITH

(75) Inventor: Seong-Kee Shin, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/165,360

(22) Filed: Oct. 2, 1998

(30) Foreign Application Priority Data

Oct. 2, 1997 (KR) .................................... 97-51052

(51) Int. Cl.[7] ..................................................... G06F 13/10
(52) U.S. Cl. ................................ 710/62; 710/2; 710/131; 361/836
(58) Field of Search ................................. 710/62, 64, 69, 710/129, 131, 2; 361/836, 837; 379/93.01; 375/222; 307/64

(56) References Cited

U.S. PATENT DOCUMENTS

| | | | |
|---|---|---|---|
| 4,578,533 | * 3/1986 | Pierce | 379/93.31 |
| 4,620,294 | * 10/1986 | Leung et al. | 375/222 |
| 4,827,111 | * 5/1989 | Kondo | 235/380 |
| 5,123,092 | * 6/1992 | Buxton et al. | 710/107 |
| 5,168,422 | * 12/1992 | Duncan | 361/836 |
| 5,245,497 | * 9/1993 | Shibui et al. | 361/40 |
| 5,265,238 | 11/1993 | Canova, Jr. et al. . | |
| 5,367,563 | * 11/1994 | Sainton | 379/93.29 |
| 5,522,089 | 5/1996 | Kikinis et al. . | |
| 5,574,859 | 11/1996 | Yeh . | |
| 5,604,916 | * 2/1997 | Kim et al. | 710/2 |
| 5,666,495 | 9/1997 | Yeh . | |
| 5,668,977 | 9/1997 | Swanstrom et al. . | |
| 5,671,366 | 9/1997 | Niwa et al. . | |
| 5,768,100 | * 6/1998 | Barrus et al. | 361/686 |
| 5,799,067 | 8/1998 | Kikinis et al. . | |
| 5,799,068 | 8/1998 | Kikinis et al. . | |
| 5,886,424 | * 3/1999 | Kim | 307/64 |
| 6,065,069 | * 5/2000 | Klein | 710/15 |

* cited by examiner

Primary Examiner—Thomas Lee
Assistant Examiner—Thuan Du
(74) Attorney, Agent, or Firm—Robert E. Bushnell, Esq.

(57) ABSTRACT

A portable computer has a modem telephone line expansion system, and includes: modem circuitry coupled to the portable computer system; a line interface section for reducing a line voltage across a telephone line to a low voltage analog signal level; and a line switch provided between an output of the line interface section and an input of the modem circuitry, and an expansion port the line switch selecting one of the telephone lines leading from the output of the line interface and the expansion port to the line input of the modem circuitry in response to a control signal produced when the portable computer is coupled to a docking station. The line interface includes a transformer with its primary coil connected to the telephone line and of its secondary coil connected to selected terminals of the line switch. Further, an expansion system for use with the above-mentioned type portable computer has a telephone line input port for connecting to a telephone cable; and an extra line interface section provided near the telephone line input port for connecting the telephone line to a port to be coupled to the portable computer.

14 Claims, 5 Drawing Sheets

PORTABLE COMPUTER WITH TELEPHONE LINE SWITCHING FUNCTION AND AN EXPANSION SYSTEM AND METHOD FOR USE THEREWITH

CLAIM OF PRIORITY

This application makes reference to, incorporates the same herein, and claims all benefits accruing under 35 U.S.C. §119 from an application for A PORTABLE COMPUTER WITH TELEPHONE LINE SWITCHING FUNCTION AND THE EXPANSION SYSTEM FOR USE THEREWITH earlier filed in the Korean Industrial Property Office on the $2^{nd}$ of October 1997 and there duly assigned Ser. No. 51052/1997.

BACKGROUND OF THE INVENTION

1. Field of the Invention

The present invention relates to portable computers, and more particularly to a portable computer having a telephone line input switching function and an expansion system for use with the portable computer.

2. Description of the Related Art

Recently, portable computers have become a popular alternative to traditional desktop computers in terms of their movability and simplicity. Further, various expansion devices have been developed for enabling the portable computers to extend battery life as well as perform multimedia functions. This is to overcome inherent functional limitations of the portable computer due to its reduced size and limited battery life. Those expansion devices, for example external speakers, external batteries or AC adapters and so forth are often incorporated into an apparatus, that is, a docking station fitted to a specific notebook computer.

Usually, the docking station is provided with a special port or connector called a "port replicator." In addition, various ports are provided so that peripheral devices such as a external display device, mouse or keyboard may be optionally connected to the docking station. The port replicator is coupled to an expansion port specially provided in the portable computer, to electrically and mechanically connect the portable computer to the docking station. With this connection, a total link can be made between the computer motherboard and the expansion devices as well as the peripheral devices of the docking station. Thus, enhancing the expandability of the portable computer is possible.

Further, the docking station may include a telephone line connector which facilitates the user to connect a telephone line to a modem board installed in the portable computer.

Such a telephone line extension system is connected to a portable computer having a modem board connected to the computer system including a CPU via a system bus. The modem board includes modem circuitry and a line interface section. Inputs of the line interface section are connected to a common telephone line via a modular jack called an RJ-11 female connector. This connector is preferably provided at a side wall of the computer main body. Telephone lines at the input of the modem are internally extended to terminals of an expansion port provided in the portable computer. Also, in the docking station, an extra telephone line connector is provided. The telephone lines leading from the connector are connected to terminals of a port replicator provided in the docking station. Thus, when the portable computer is docked with the docking station, and the port replicator is coupled to the expansion port, the telephone lines at the input of the modem can be extended to the extra telephone line connector of the docking station through the expansion port and port replicator. An RF-11 male connector at the telephone cable is coupled to the extra telephone line connector to establish a telephone line connection through the docking station. When the portable computer is used separately, another RJ-11 cable connector may be coupled to the connector of the portable computer.

However, such a telephone line expansion system has problems in that the telephone lines leading from the extra telephone line connector to the input stage of the modem board affects the electrical safety of the expansion port and the port replicator since the telephone lines are supplied with a high voltage and such a high voltage passes by relatively low voltage terminals of the expansion port and port replicator. Furthermore, high-voltage telephone lines provided in the docking station and the portable computer may cause considerable electromagnetic interference and electrostatic discharge.

The following patents each discloses features in common with the present invention but do not teach or suggest the specifically recited features of the present invention: U.S. Pat. No. 5,574,859 to Yeh, entitled Method And Apparatus For Using A Software Configurable Connector To Connect A Palmtop Computer Having A Custom Port To A Host Having A Standard Port, U.S. Pat. No. 5,265,238 to Canova Jr. et al., entitled Automatic Device Configuration For Dockable Portable Computers, U.S. Pat. No. 5,666,495 to Yeh, entitled Method And Structure For Data Transfer Between A Standard Port Of A Host Computer And A Custom Port Of A Palmtop Computer Using A Docking Station, U.S. Pat. No. 5,671,366 to Niwa et al., entitled Operating System Optimization To Permit Use Of A First Unit With A Second Unit To Extend The Functionality Of The First, U.S. Pat. No. 5,668,977 to Swanstrom et al., entitled Dockable Computer System Capable Of Electric And Electromagnetic Communication, U.S. Pat. No. 5,522,089 to Kikinis et al., entitled Personal Digital Assistant Module Adapted For Initiating Telephone Communications Through DTMF Dialing, U.S. Pat. No. 5,799,067 to Kikinis et al., entitled Smart Phone Integration With Computer Systems, and U.S. Pat. No. 5,799,068 to Kikinis et al., entitled Smart Phone Integration With Computer Systems.

SUMMARY OF THE INVENTION

The present invention is intended to solve the abovenoted problems, and it is therefore an object of the present invention to provide a portable computer having modem telephone lines extended to a docking station through connectors in which switching of modem input lines is performed to reduce occurrence of EMI and to prevent ESD in the extended telephone line.

It is another object of the present invention to provide an expansion system of a portable computer having a telephone line expansion port which can prevent telephone lines extended to the portable computer from being supplied with the high voltage of the telephone line.

In accordance with the present invention, there is provided a portable computer having a modem telephone line expansion system, which comprises: modem circuitry coupled to the portable computer system; a line interface section provided near a telephone line input port for reducing the line voltage across the telephone line to a low voltage analog signal level; and a line switch provided between the output line of the line interface section and the input line of the modem circuitry, and an expansion port disposed on a side portion of the portable computer and connected thereto by an extension line, the line switch selecting one of the telephone lines leading from the output of the line interface and the expansion port to the line input of the modem circuitry in response to a control signal produced when the portable computer is coupled to a docking station.

In the preferred form of this invention, the line interface section includes input resistors serially connected to each telephone line, a constant current DC holding circuit and a protection circuit provided across the telephone lines, a hook switch provided at a telephone line, a transformer having its primary coil connected to the telephone lines and its secondary coil connected to selected terminals of the line switch.

Particularly, the primary coil and secondary coil of the transformer have a predetermined turns ratio which allows the transformer to drop the high level telephone line voltage supplied to the primary coil to a low voltage analog signal level.

Further, the line switch includes a relay having two switches and an actuator coil with their normally closed contacts placed between the secondary coil of the transformer and the telephone line input of the modem circuitry.

The relay coil is coupled to a control signal line which supplies an operating voltage for energizing the relay coil. One end of the relay coil is connected to a Docking_in signal input terminal which is in turn connected to a terminal of the expansion port for receiving the operating voltage for the relay coil.

In accordance with the present invention, there is provided an expansion system for use with the above-mentioned type portable computer which comprises: a telephone line input port for connecting to a telephone cable; and an extra line interface section provided near the telephone line input port for connecting the telephone line to a port to be coupled to the portable computer and for reducing the line voltage across the telephone line to a low voltage analog signal level, wherein the telephone line extended to the portable computer is prevented from being supplied with the high voltage of the telephone line.

According to the invention, since the extended telephone lines provided between the extra line interface and the line switch have a relatively low voltage level, the electrical safety between terminals of docking connectors is ensured and the modem telephone line expansion system is secured from the high voltage telephone line.

BRIEF DESCRIPTION OF THE DRAWINGS

This invention may be understood and its object and advantages will become apparent to those skilled in the art by reference to the accompanying drawings in which.

DETAILED DESCRIPTION OF PREFERRED EMBODIMENTS

Figure 2:
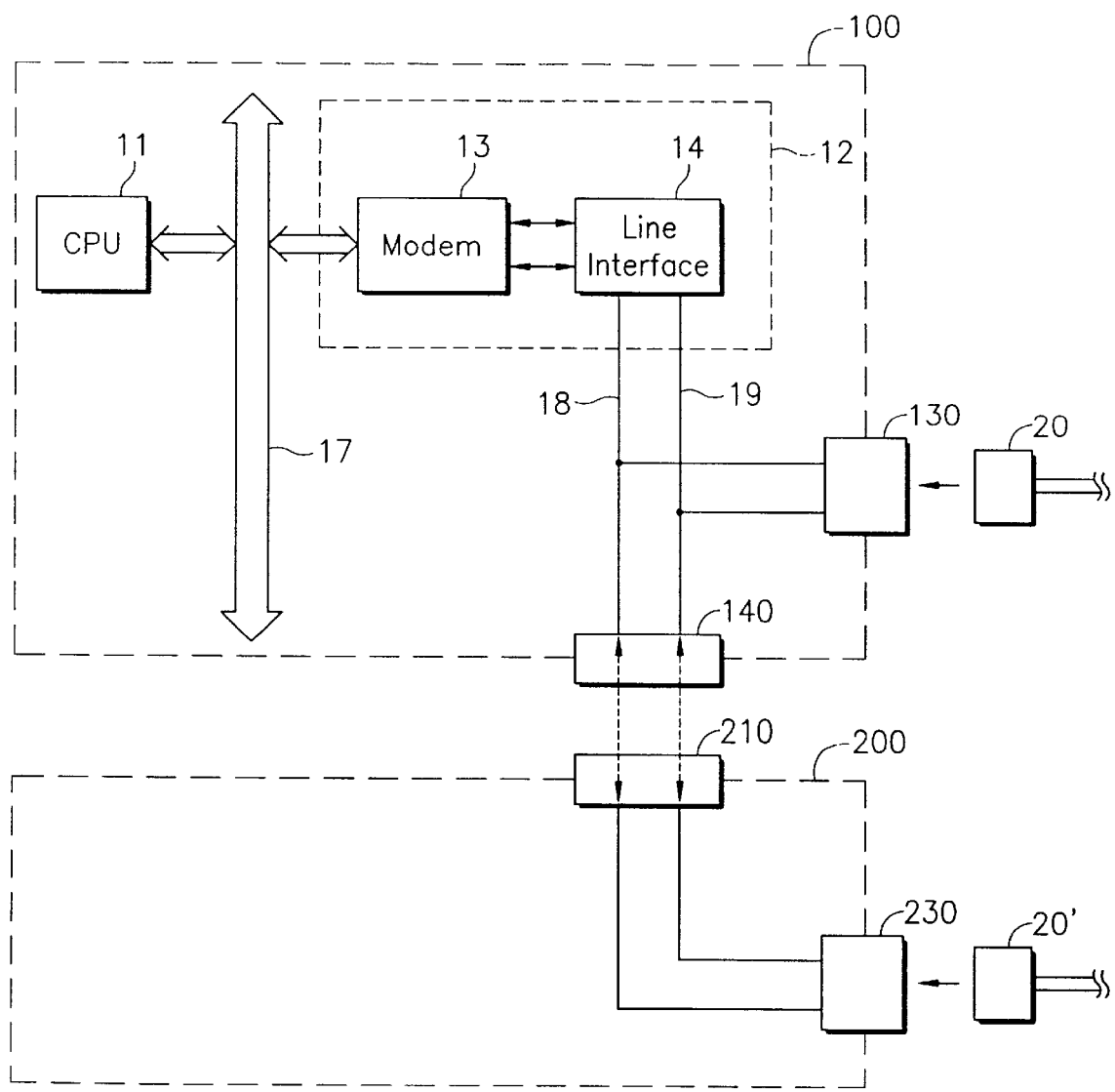
FIG. 2 is a block diagram of a telephone line expansion system adopted in the portable computer and docking station.

A telephone line expansion system, as discussed in the Description of the Related Art above, is shown in FIG. 2. In a portable computer 100, a modem board 12 is coupled to a computer system including a CPU 11 via system bus 17. The modem board 12 includes modem circuitry 13 and a line interface section 14. Inputs of the line interface section 14 are connected to a common telephone line via a modular jack called an RJ-11 female connectors 130. This connector 130 is preferably provided at a side wall of the computer main body. The telephone lines 18 and 19 at the input of the modem are internally extended to terminals of an expansion port 140 provided in the portable computer. Also, in a docking station 200, an extra telephone line connector 230 is provided. The telephone lines leading from the connector 230 are connected to terminals of a port replicator 210 provided in the docking station 200. Thus, when the portable computer 100 is docked with the docking station 200, and the port replicator 210 is coupled to the expansion port 140, the telephone lines 18 and 19 at the input of the modem 12 can be extended to the extra telephone line connector 230 of the docking station 200 through the ports 140 and 210. The RJ-11 male connector 20' at the telephone cable is coupled to the extra telephone line connector 230 to establish a telephone line connection through the docking station 200. When the portable computer 100 is used separately, another RJ-11 cable connector 20 may be coupled to the connector 130.

However, such a telephone line expansion system has problems in that the telephone lines leading from the extra telephone line connector 230 to the input stage of the modem board 12 affects electrical safety of the connectors 140 and 210 since the telephone lines are supplied with a high voltage (about 50 Volts) and it passes by relatively low voltage terminals of the connectors 140 and 210. Further, high-voltage telephone lines provided in the docking station 200 and the portable computer 100 may cause considerable electromagnetic interference (EMI) and electrostatic discharge (ESD).

Figure 1:
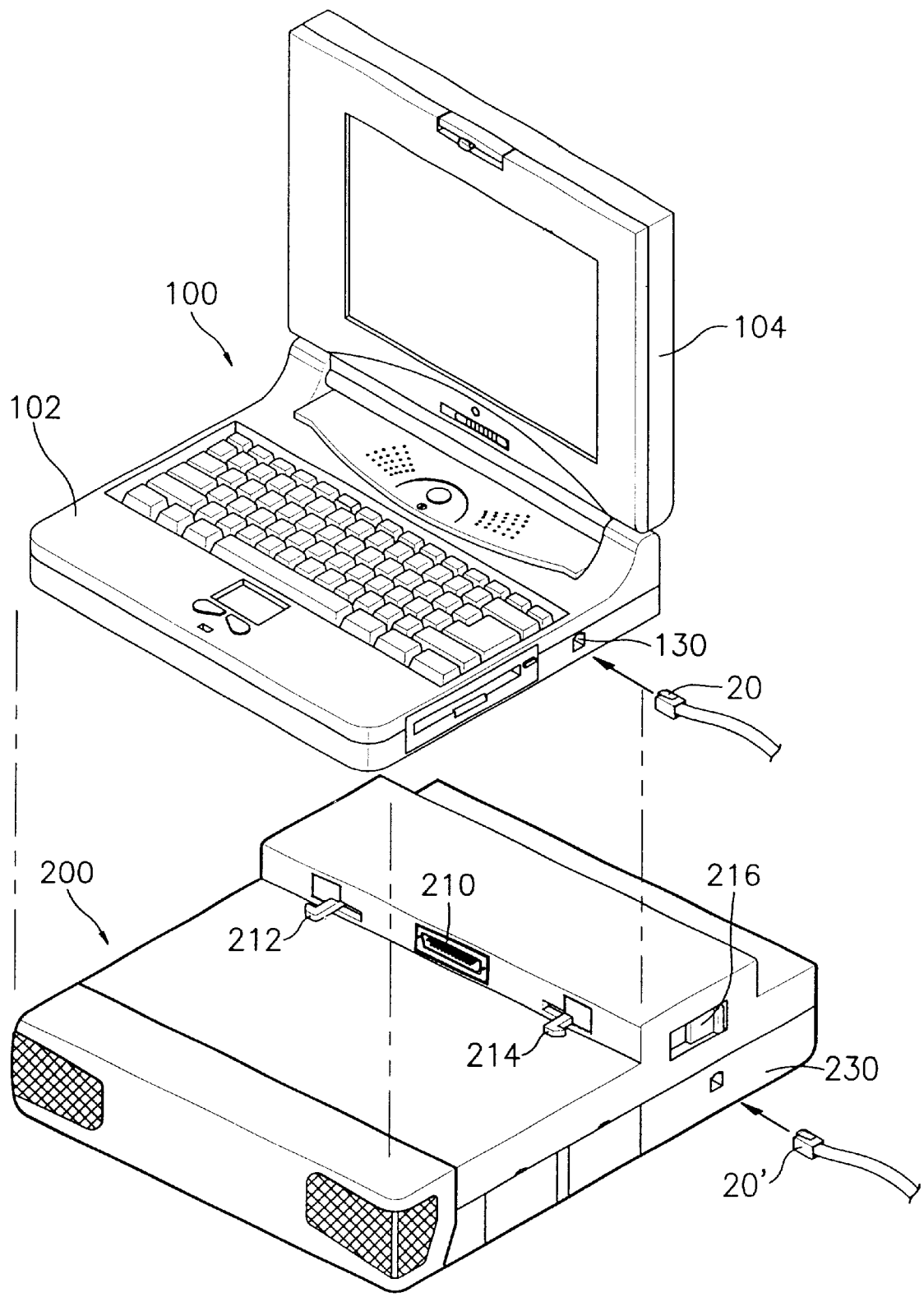
FIG. 1 is a perspective view illustrating a portable computer and a docking station.

Referring to FIG. 1, there are shown a portable computer 100 and an expansion system 200 to be used with the portable computer. The portable computer 100 includes main body 102 having at a top side thereof a keyboard and a pointing device and a flat panel display 104 hingedly attached to the rear side of the main body 102. The expansion system, called docking station 200 includes various expansion devices, for example CD-ROM drives, an extra sound card or video card, extra speakers, and an additional battery or AC adapter. The docking station 200 further includes a port replicator 210 to be coupled to an expansion port (not illustrated) provided in the rear side of the portable computer 100, in order to establish electrical connection with the portable computer 100. Further, the docking station 200 has an extra telephone line input port 230 for connecting to the telephone cable, which facilitates the user to connect a telephone line to a modem board installed in the portable computer 100. Also, the portable computer 100 has a telephone line input port or connector 130 connected to the internal modem.

The telephone line connectors 130 and 230 usually adopt a 6-pin modular jack or an RJ-11 female connector. Also, the telephone cable is provided with an RJ-11 male connector 20 at the end thereof. The other end of the cable is connected to an analog wall jack of the telephone line.

When the portable computer 100 is used with the docking station 200, the telephone cable connector 20' is preferably coupled to the extra telephone line connector 230 to establish a telephone line connection through the docking station 200. Further, provided at either side portion of the connector 210 is a pair of hooks 212 and 214, and an actuator 216 for mechanically locking/releasing the portable computer 100 relative to the docking station 200. The expansion port preferably uses male connectors, and the port replicator 210 preferably uses female connectors.

Figure 3:
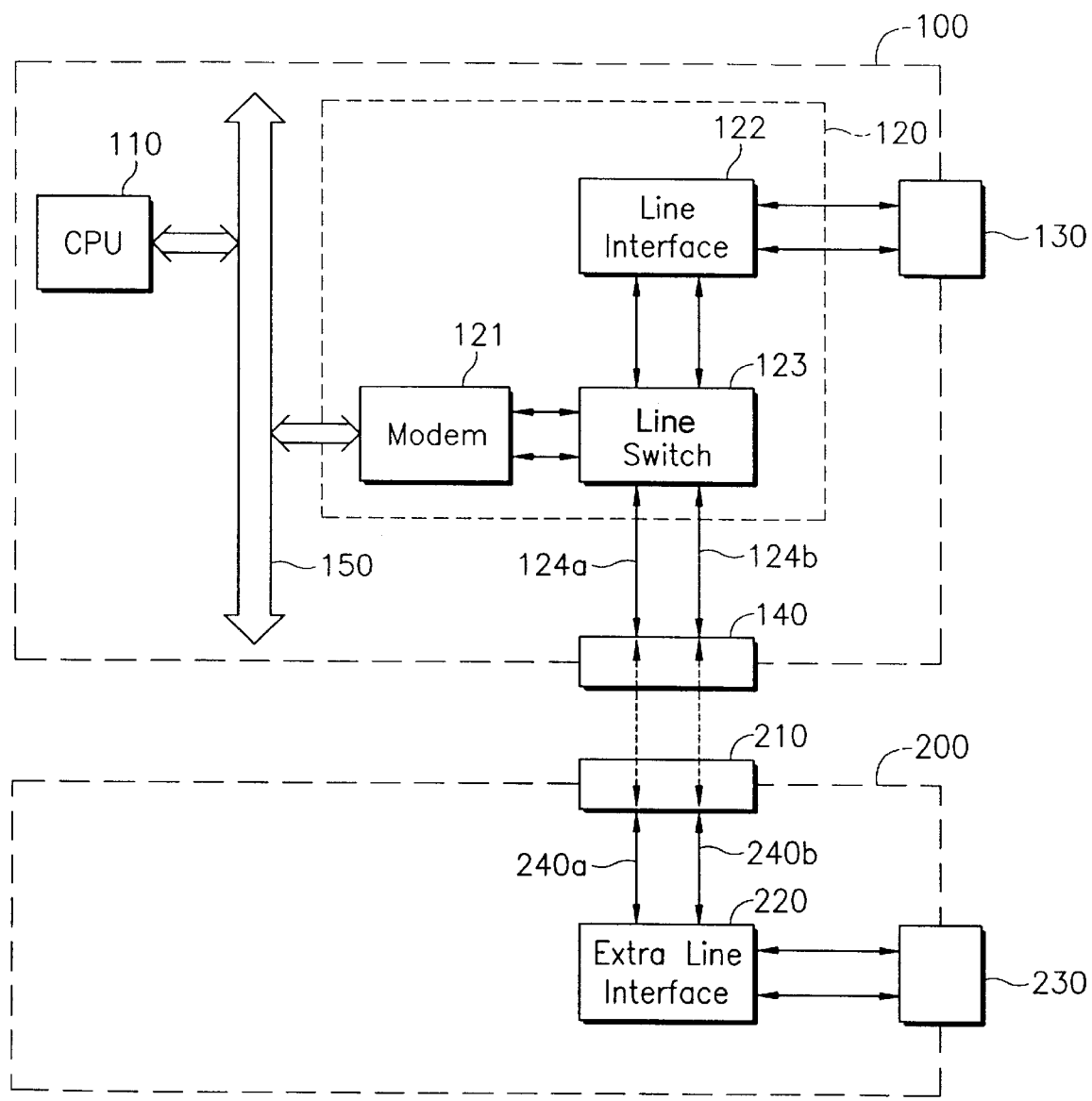
FIG. 3 is a block diagram of a telephone line expansion system adopted in the portable computer and docking station of FIG. 1 in accordance with the present invention.

The portable computer and docking station adopt a telephone line expansion system in accordance with the present invention. As shown in FIG. 3, the portable computer 100 includes a modem board 120 coupled to a computer system having a CPU 110 via a system bus 150. The modem board 120 includes modem circuitry 121, a line interface section 122, and a line switch 123. Inputs of the line interface section 122 are connected to the telephone line via the connector 130. Outputs of the line interface section 122 are connected to the modem circuitry 121 via the line switch 123. Also, the inputs of the modem circuitry 121 are extended to terminals of the expansion port 140 via the line switch 123 and extension lines 124a and 124b. The line switch 123 selects one of the telephone lines leading from the output of the line interface 122 and the expansion port 140 to the line input of the modem circuitry 121 in response to a control signal which will be described later. Also, in the docking station 200, an extra line interface section 220 is provided to connect to the telephone line via an extra telephone line connector 230. The configuration of the extra line interface section 220 is the same as that of the line interface section 122 of the portable computer 100. Output lines 240a and 240b of the extra line interface section 220 are connected to terminals of the port replicator 210 of the docking station 200. Thus, when the portable computer 100 is docked with the docking station 200, the extension lines 124a, and 124b from the line switch 123 can be connected to the lines 240a, and 240b from the extra line interface section 220 through the ports 140 and 210.

Figure 4:
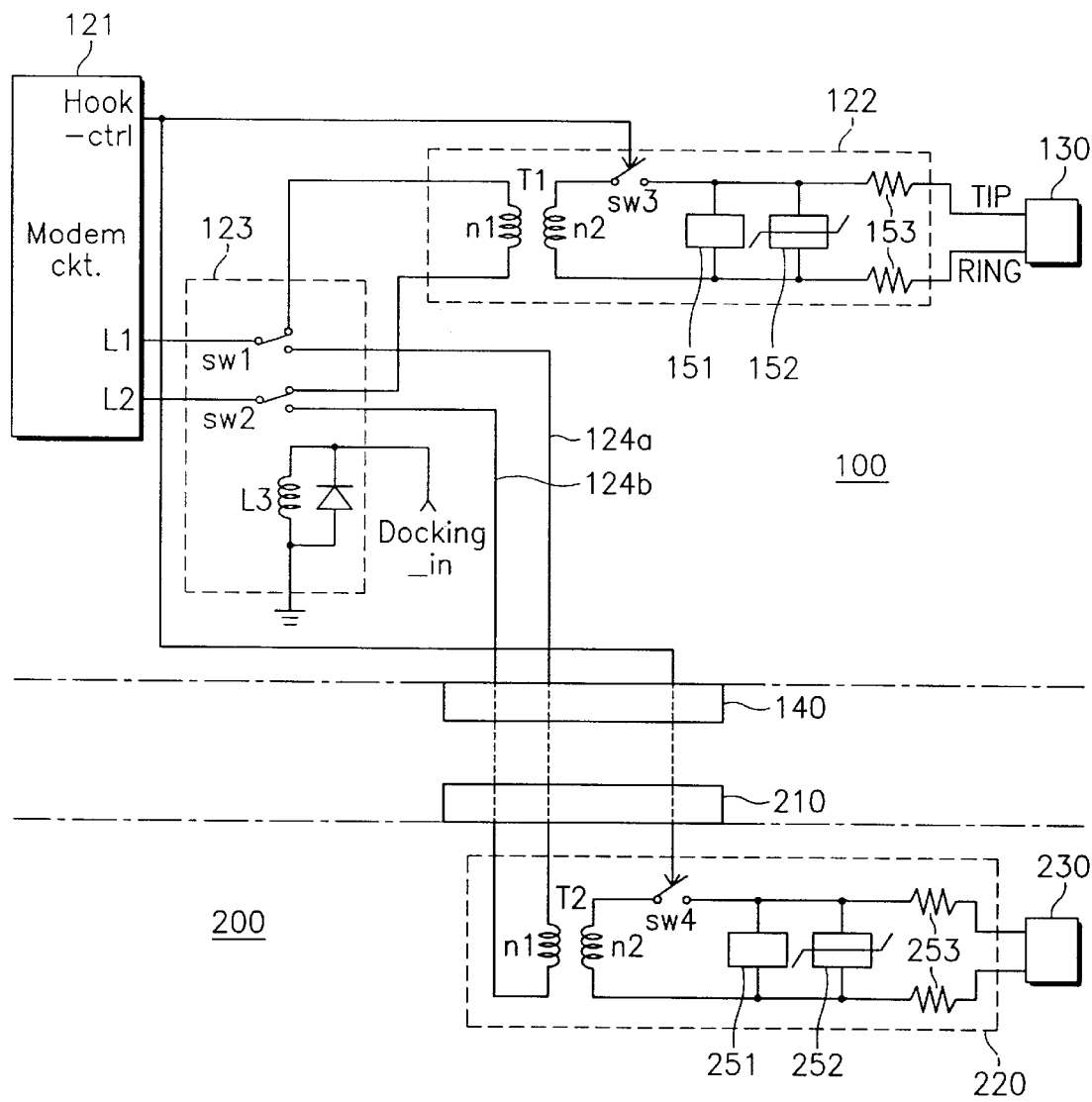
FIG. 4 is a schematic diagram of the telephone line expansion system shown in FIG. 3.

More specifically, as shown in FIG. 4, the line interface section 122 includes input resistors 153 serially connected to TIP and RING telephone lines, a constant current DC holding circuit 151 and a protection circuit 152 provided across the telephone lines, a hook switch SW3 provided at the TIP side telephone line, a transformer T1 with its primary coil connected to the telephone lines. The hook switch SW3 is a normally open SPST type and is actuated by a relay in the modem circuitry 121. Further, the primary coil and secondary coil of the transformer T1 have a predetermined turns ratio which allows the transformer to drop the high level telephone line voltage supplied to the primary coil, for example 50 Volts, to a low voltage analog signal level of about 5 Volts. In this case, the turns ratio of the primary coil to the secondary coil will be 10:1.

The secondary coil of the transformer T1 is coupled to line inputs L1 and L2 of the modem circuitry 121 via the line switch 123. The line switch 123 consists of a relay having two switches SW1 and SW2 and an actuator coil L3. The relay switches SW1 and SW2 are of a SPDT type with their normal closed contacts respectively placed between the secondary coil of the transformer T1 and telephone line inputs L1 and L2 of the modem circuitry 121. Further, the normally open contacts of the relay switches SW1 and SW2 are connected to designated terminals of the expansion port 140 through the extension lines 124a and 124b, respectively. The relay coil L3 is coupled to a control signal line which supplies an operating voltage for energizing the relay coil when the portable computer 100 is docked with the docking station 200. In addition, a surge clamp diode is coupled across the relay coil L3.

In the normal state or non-relay-actuated state, the line switch 123 maintains the telephone line connection between the line interface section 122 and the modem circuitry 121. In the relay actuated state, the line switch 123 interrupts the line connection from the line interface section 122 to the modem circuitry 121, and switches the telephone line input to connect the modem circuitry 121 to the extension lines 124a and 124b.

Also, the extra line interface section 220 provided in the docking station 200 has the same configuration as that of the line interface section 122. The extra line interface section 220 includes input resistors 253 serially connected with the lines from the extra telephone line connector 230, a constant current DC holding circuit 251 and a protection circuit 252 provided across the telephone lines, a hook switch SW4 provided at the TIP line side, a transformer T2 with its primary coil connected to the telephone lines. The hook switch SW4 is of a normally open SPST type and arranged to operate simultaneously with the hook switch SW3 when the portable computer is docked with the docking station. The primary coil and secondary coil of the transformer T2 have the same predetermined turns ratio as designated in the transformer T1. The secondary coil of the transformer T2 is connected to terminals of the port replicator 210.

Figure 5:
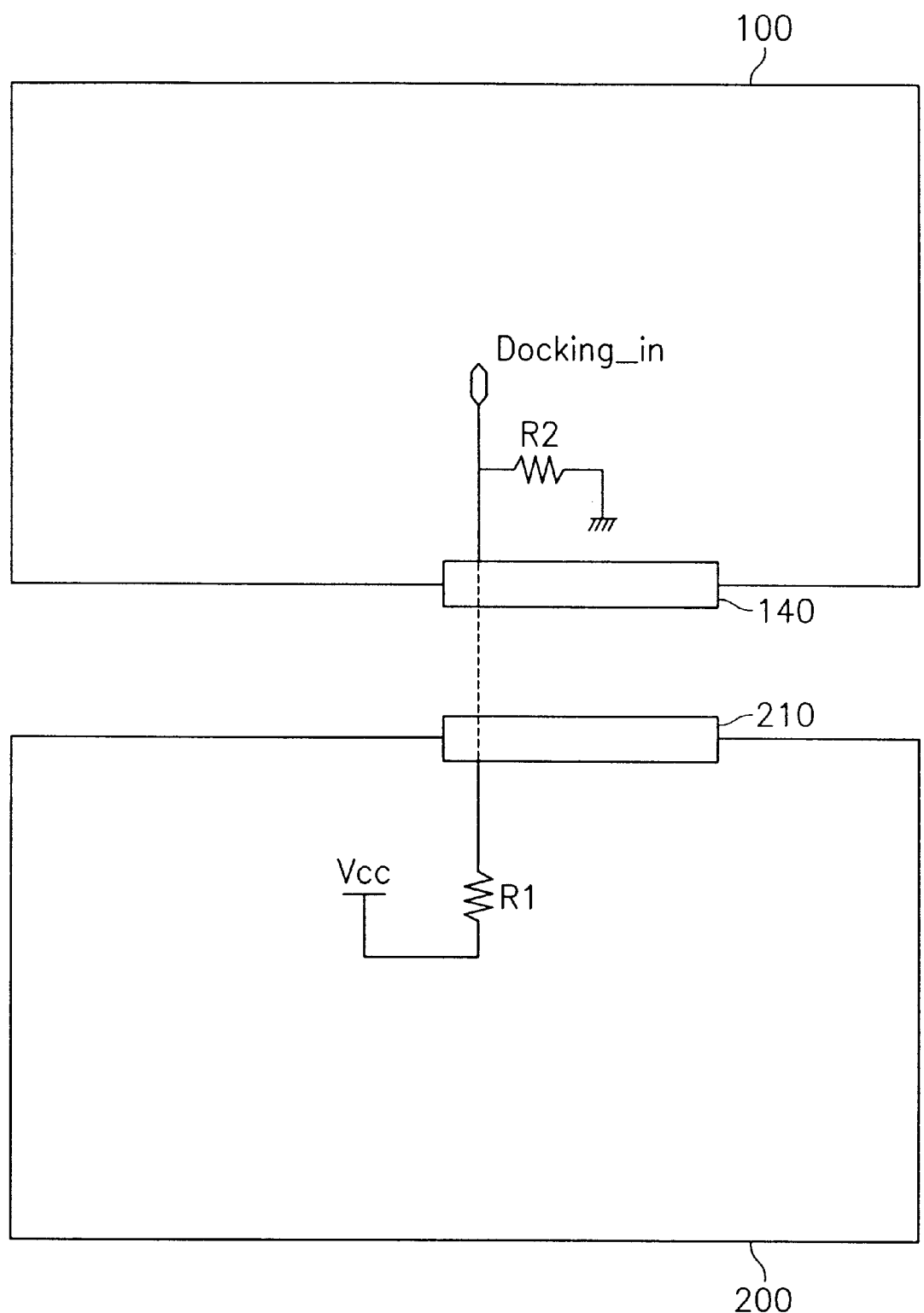
FIG. 5 is a schematic diagram of a docking-in signal generation circuitry used in this invention.

Referring to FIG. 5, there is shown a control signal generating circuit. One end of the relay coil L3 (FIG. 4) is connected to a Docking_in signal input terminal provided in the portable computer 100. This terminal is also connected to a terminal of the expansion port 140 and a resistor R2 connected to the ground. Further, in the docking station part 200, an operating voltage terminal Vcc is connected to a terminal of the port replicator 210 via a series resistor R1. Thus, the operating voltage Vcc is supplied to the Docking_in terminal when the expansion port 140 of the portable computer 100 is coupled to the port replicator 210 of the docking station 200.

The operating voltage Vcc supplied to the Docking_in terminal acts as a control signal to energize the relay coil L3 and thus to change contact direction of the relay switches SW1 and SW2. Upon energizing of the relay coil L3, the contact direction of the switches SW1 and SW2 is changed so that the extension lines 124a and 124b are connected to the inputs L1 and L2 of the modem circuitry 121. Also, in the docking state, the extension lines 124a and 124b are connected to the secondary coil of the transformer T2 through the ports 140 and 210.

In this docking state, if the hook switches SW3 and SW4 are closed in response to a hook control signal fed from the modem circuitry 121, the telephone line connection path is established from the extra telephone line connector 230 to the inputs L1 and L2 of the modem circuitry 121 via the extra line interface 220 and the line switch 123. In the extra line interface 220, the transformer T2 converts the high level telephone line voltage supplied across the primary coil, for example 50 Volts, into a low voltage analog signal level, for example about 5 Volts, occurring at the secondary coil of the transformer T2.

Since the low voltage analog telephone signal is supplied to inputs L1 and L2 of the modem circuitry 121 by the extension lines 124a and 124b, the occurrence of electromagnetic interference (EMI) and electrostatic discharge (ESD) due to the extension lines 124a and 124b can be considerably reduced. Further, since the extended telephone lines 124a and 124b provided between the output of the transformer T2 and the relay switches SW1 and SW2 have a relatively low voltage level, and these extension lines are passed through the terminals of the expansion ports 140 and the port replicator 210 using a digital signal voltage level, the electrical safety between terminals of connectors is ensured and the modem telephone line expansion system is secured from the high voltage telephone line.

Also, in the portable computer part 100, as the telephone lines extended from the output of the transformer T1 of the line interface 122 to the inputs L1 and L2 of the modem circuitry 121 have a relatively low voltage level, the electrical safety at the line input part of the modem circuitry is ensured against the high voltage.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modification may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A portable computer having a modem telephone line expansion system, comprising:
    modem circuitry coupled to the portable computer;
    a line interface section for receiving input from a telephone line input port for reducing a line voltage across a telephone line coupled to the line interface section to a low voltage analog signal level; and
    a line switch provided between an output of the line interface section and a line input of the modem circuitry, and an expansion port disposed on a side of the portable computer and connected to the line switch by an extension line, the expansion port for receiving input from a telephone line when the portable computer is coupled to a docking station,
    the line switch selecting one of the telephone lines leading from the output of the line interface section and the expansion port to the line input of the modem circuitry in response to a control signal.

2. The portable computer of claim 1, further comprised of the line interface section comprising: input resistors respectively serially connected to a corresponding telephone line coupled to the line interface section, a constant current DC holding circuit and a protection circuit disposed across the corresponding telephone line coupled to the line interface section, a hook switch disposed in the corresponding telephone line coupled to the line interface section, and a transformer having a primary coil connected to the corresponding telephone line coupled to the line interface section and having a secondary coil connected to selected terminals of the line switch.

3. The portable computer of claim 2, further comprised of the primary coil and the secondary coil of the transformer having a predetermined turns ratio for allowing the transformer to drop a high level telephone line voltage supplied to the primary coil to the low voltage analog signal level.

4. The portable computer of claim 3, further comprised of the line switch comprising:
    a relay having two switches and an actuator coil with normally closed contacts placed between the secondary coil of the transformer and the line input of the modem circuitry.

5. The portable computer of claim 4, further comprised of the actuator coil being coupled to a control signal line which supplies an operating voltage for energizing the actuator coil.

6. The portable computer of claim 5, further comprised of one end of the actuator coil being connected to a Docking_in signal input terminal which is in turn connected to a terminal of the expansion port for receiving the operating voltage for the actuator coil.

7. The portable computer of claim 1, further comprising an expansion system for use with the portable computer, comprising:
    a telephone line input port of the docking station for the portable computer for connecting to a telephone cable for a telephone line; and
    an extra line interface section in the docking station for receiving input from the telephone line input port of the docking station for connecting a telephone line to a port replicator of the docking station to be coupled to the portable computer and for reducing a line voltage across the telephone line to be connected to the port replicator of the docking station to the low voltage analog signal level, the telephone line to be connected to the port replicator of the docking station, when extended to the portable computer through the port replicator of the docking station, being prevented from being supplied with a high voltage of the telephone line to be connected to the port replicator of the docking station.

8. The portable computer of claim 7, further comprised of the extra line interface section of the expansion system comprising: input resistors respectively serially connected to the telephone line to be connected to the port replicator of the docking station, a constant current DC holding circuit and a protection circuit disposed across the telephone line to be connected to the port replicator of the docking station, a hook switch disposed in the telephone line to be connected to the port replicator of the docking station, a transformer having a primary coil connected to the telephone line to be connected to the port replicator of the docking station and having a secondary coil connected to selected terminals of the port replicator of the docking station.

9. The portable computer of claim 8, further comprised of the primary coil and the secondary coil of the transformer having a predetermined turns ratio for dropping the high voltage of the telephone line to be connected to the port replicator of the docking station supplied to the primary coil to the low voltage analog signal level.

10. An expansion system for use with a portable computer, comprising:
    a telephone line input port of a docking station for a portable computer for connecting to a telephone cable for a telephone line; and
    an extra line interface section in the docking station for receiving input from the telephone line input port for connecting the telephone line to a port of the docking station to be coupled to the portable computer and for reducing a line voltage across the telephone line to a low voltage analog signal level, the telephone line when extended to the portable computer through the port of the docking station to be coupled to the portable computer being prevented from being supplied with a high voltage of the telephone line.

11. The expansion system of claim 10, further comprised of the extra line interface section comprising: input resistors respectively serially connected to the telephone line, a constant current DC holding circuit and a protection circuit disposed across the telephone line, a hook switch disposed in the telephone line, and a transformer having a primary coil connected to the telephone line and having a secondary coil connected to selected terminals of the port of the docking station to be coupled to the portable computer.

12. The expansion system of claim 11, further comprised of the primary coil and the secondary coil of the transformer having a predetermined turns ratio for dropping the high voltage supplied to the primary coil to the low voltage analog signal level.

13. A method of reducing a line voltage in a modem telephone line expansion system in a portable computer, comprising the steps of:

providing modem circuitry coupled to the portable computer;

providing a line interface section for receiving input from a telephone line input port;

reducing by the line interface section a line voltage across a telephone line coupled to the line interface section to a low voltage analog signal level; and providing a reduced line voltage having the low voltage analog signal level from the line interface section to the modem circuitry.

14. The method of claim 13, further comprising the steps of:

providing a docking station for the portable computer;

providing a telephone line input port of the docking station;

providing an extra line interface section in the docking station for receiving input from the telephone line input port of the docking station;

reducing by the extra line interface section a line voltage across a telephone line connected to the telephone line input port of the docking station to the low voltage analog signal level; and providing a reduced line voltage of the telephone line connected to the telephone line input port of the docking station having the low voltage analog signal level from the extra line interface section to a port of the docking station to be coupled to the portable computer.

\* \* \* \* \*